Jan. 12, 1943. F. L. WHITE 2,308,137
POWER TRANSMITTING COUPLING
Original Filed Feb. 10, 1940
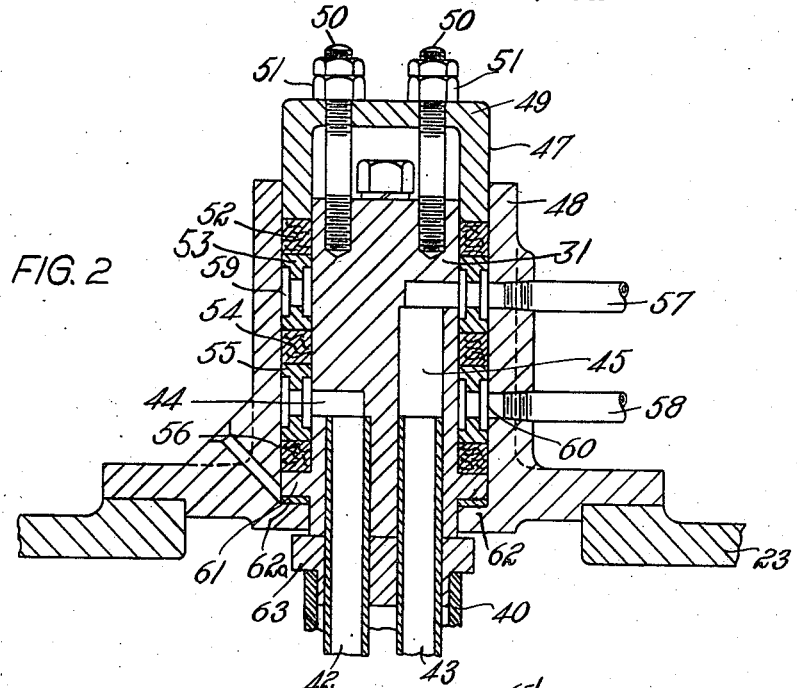
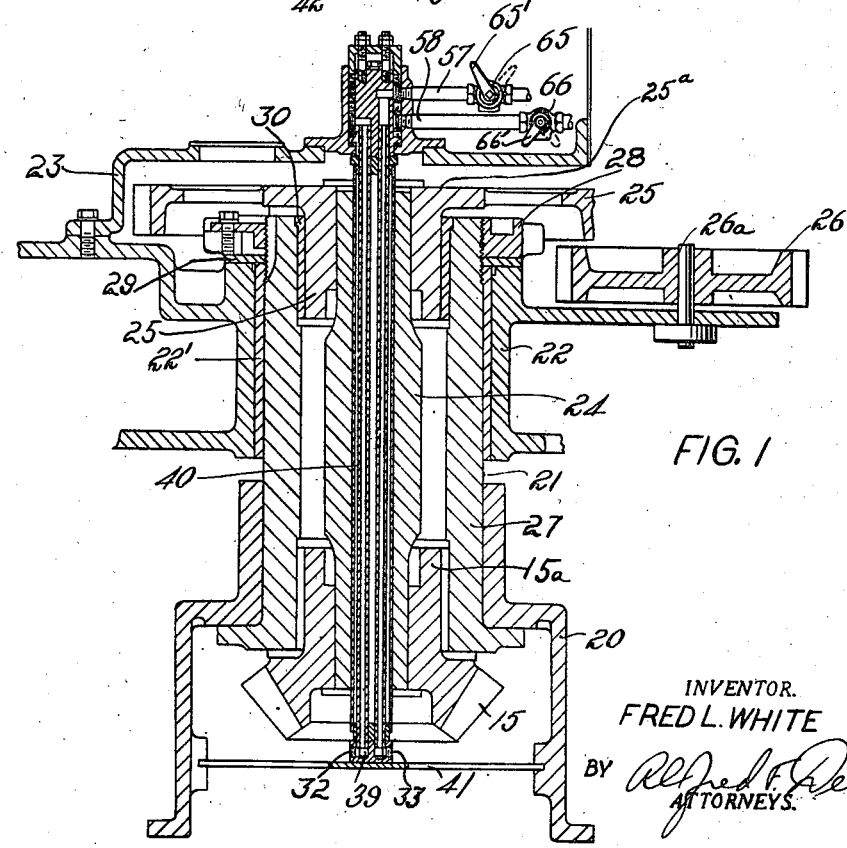
INVENTOR.
FRED L. WHITE
BY
ATTORNEYS.

Patented Jan. 12, 1943

2,308,137

UNITED STATES PATENT OFFICE 2,308,137

POWER TRANSMITTING COUPLING

Fred L. White, Marion, Ohio, assignor to The Osgood Company, Marion, Ohio, a corporation of Ohio Original application February 10, 1940, Serial No. 318,332, now Patent No. 2,254,192, dated June 24, 1941. Divided and this application July 19, 1941, Serial No. 403,246

11 Claims. (Cl. 137—78)

This invention relates to couplings and in its more specific aspects relates to coupling devices employable in traction devices adaptable to transmit motive power for steering and for propelling such traction devices.

The object of this invention is to construct a coupling device adapted to transmit mechanical and hydraulic power.

A further object of the invention is to couple the means for transmitting mechanical power and the means for transmitting pressure fluid such that the devices are arranged about a common axis of rotation relatively of each other.

Another object of the invention is to construct a compound coupling such that relative rotative motion may be accomplished without loss of pressure fluid and without disturbing the transmission of mechanical power.

Another and still further object of the invention is to construct a compound coupling in which the several parts mutually support each other and which are capable of ready and easy dis-assembly or repair and inspection.

Other and further objects of the invention are to reduce the cost of manufacture, prevent losses of power within the coupling and to simplify its construction.

Other and further objects of the invention will appear to those skilled in the arts to which this invention pertains as the description proceeds which taken in connection with the accompanying drawing sets forth a preferred embodiment of the invention but such disclosures and descriptions are not to be construed as a limitation of the invention which is limited only by the appended claims and any and all alterations, modifications and variations of structure coming within the spirit and scope of the invention are deemed to be included herein.

In the drawing:

Figure 1 shows a vertical section view of the compound coupling.

Figure 2 shows an enlarged view of the upper end of the coupling in section.

This application is a division of my previous application Serial No. 318,332, filed February 10, 1940, which has been issued as Patent No. 2,254,192, granted June 24, 1941.

In portable excavators and similar pieces of equipment it is very desirable that the mechanism for transmitting power from some appropriate source located on one part of the machine; e. g. the deck; to another part used for locomotion purposes and means for actuating the steering mechanism part of which is located on the deck of the machine and conducting its motive power to another part be transmitted down and through a common coupling mechanism such that when the machine parts are moved relatively of each other that may be also controlled from a single position. It is frequently desirable to use pressure fluid of one variety or another to actuate the steering mechanism and this invention is therefore primarily concerned with a compound coupling mechanism capable of transmitting both mechanical power and pressure fluid in which the several coupling parts are complemental to each other and in which each part functions in its own sphere but in which the parts are mutually dependent upon each other for support.

The above results are achieved by the use of a mechanism disclosed in the drawing in which 20 indicates a part of a coupling support which is secured to the frame of a traction device and 22 indicates part of the platform or deck device. Parts 20 and 22 rotate relatively of each other by means of coupling 21; the part 20 being in the specific instance attached to the crawler of a crane or excavator and 22 being the part to which the cab is secured and which mounts a source of power, the transmission and the controls therefor and 21 indicates generally the mechanism whereby power is transmitted to the crawler, the power for governing the steering of the device and for selectively rotating supporting parts 20 and 22.

The source of power previously mentioned which usually originates in some form of motor is by a suitable transmission applied to a gear 26 rotatably supported on a pin 26a fixed in the deck 22 and then by means of another gear system (not shown) is connected to the gear 25. Gear 25 has a hub 25a into which pinion sleeve element 24 is snugly fitted and which sleeve has snugly fitted onto its lower end the hub 15a of a bevel gear 15 which is adapted to be operatively associated with the mechanism for traversing the crawler device. The gears 25 and 15 and the sleeve 24 to which they are secured are rotatably supported in a sleeve 27 fixed in the part 20 and at its other end rotatably supports element 22 by means of a bearing 22'. Sleeve 27 is threaded at its upper end and has a retaining element 28 threadably secured thereon which element bears on bearing element 29 such as to aid in permitting the relative rotation of parts 20 and 22. To facilitate the relative rotation of gear 25 and shaft or supporting sleeve 27 a bearing 30 is interposed between them. It should be apparent from the foregoing that parts 20 and 22 rotate relatively of each other and that means are incorporated for transmitting mechanical power to gear 15.

The deck or element 22 supports mechanism for transmitting power for governing the steering of the traction or crawler device to which element 20 is secured which originates in a suitable compressor (not shown) mounted on deck 22 and which has conduits 57 and 58 connected thereto for transmitting pressure fluid to the mechanism described above. Conduits 57 and 58 each have a three way valve 65 and 66 incorporated in the line each of which is operable by means of handles 65' and 66'. One of the valves controls the steering in one direction and the other valve controls the steering in the other direction. The conduits 57 and 58 are then lead to a pressure fluid coupling 47 having a housing or casing 48 which is rigidly secured to the deck 22 through means of an intermediate supporting element 23; the housing 48 being appropriately ported to receive the conduits 57 and 58.

The coupling 47 comprises a housing 48 which has concentrically arranged therein a core element comprising a main body 31 having passageways or ports 44 and 45 formed therein. These ports extend into the body 31 and then turn downwardly into the portion of the body that is flanged or collared as at 61 and has a bearing 62a interposed between the flange or collar 61 and a flange 62 on the housing 48 to permit the relative rotation of the parts. Surrounding the body 31 are a pair of internally and externally grooved rings 53 and 55 ported at 59 and 60 which by reason of their construction are adapted to transmit pressure fluid in any relative rotational position of the body 31 and the housing 48. Surmounting the body 31 and snugly fitting the interior of the casing 48 is a cap element 49 secured to the body 31 by means of nut elements 51, 51 threaded onto studs 50, 50 turned into the body 31. Leakage to the atmosphere and from one conduit to the other of the pressure fluid is prevented by means of a plurality of packing rings 52, 54, 56 interposed between the rings 53 and 55 and the collar 61 and the cap 49 and each of the rings 53 and 55. When excessive wear has been imposed on the parts causing leakage it may be compensated or prevented by tensioning studs 50, 50.

Pressure fluid is conducted through the rotatable elements in appropriate conduits and means for supporting them are provided comprising a torsion resisting tube 40 which is snugly fitted onto the flange of a collar element 63 which element is directly engaged by the lower end of body 31. The other end of the tube 40 terminates in a head structure 39 provided with a pair of ports 32 and 33. The head structure 39 is fixed to and supported directly on a bridging element 41 held in support or part 20.

Disposed within the tube 40 are two conduits 42 and 43 which are connected between the ports 44 and 45 in the body 31 and the ports 32 and 33 in the head 39. The ports 44 and 45 in the body 31 at their lower ends are counterbored and these counterbores receive the conduits 42 and 43. A similar expedient is used in the head structure 39.

It is evident from the foregoing that the tube 40 is rigidly held in the coupling device 47 and is adapted to resist the torsional strains imposed by reason of the turning action of gears 25 and 15 and the pinion sleeve 24 and the rotational motion of the deck or part 22. Therefore since the tube 40 is held against twisting or torsion the conduits 42 and 43 are likewise prevented from twisting which results in holding the body 31 rigid. Pressure fluid, therefore, is conducted in any rotational position of the body 31 and the element or deck 22 and casing 48 secured thereto to the ultimate devices while the rotational elements 15, 24, and 25 are rotating thereby insuring operation at any time of the several elements of the device in which the coupling is employed.

That which is considered new, novel and useful and which is sought to be protected by Letters Patent of the United States is as follows:

1. A fluid and power transmitting coupling for transmitting mechanical power and fluid from a first member to another member rotatable relative to said first member which comprises; a first means connecting said members and adapted to support said members for relative rotation; a hollow relatively rotatable shaft mounted in said first means; a tubular element mounted in said shaft and held stationary with respect to said shaft; a second supporting means fixed on one of said members; a third means held in said second supporting means and provided with a pair of circumferentially grooved rings and secured to said tubular element at its one end, the other end of said tubular element fixed to said other member; a pair of conduits mounted in said tubular element and connected to said pair of grooved rings on said third means, said tubular element preventing twisting of said conduits when said members rotate relatively of each other; conduits rigidly secured in said second supporting means and connected to said pair of grooved rings; and means to prevent leakage of pressure fluid from said second and third means and between said grooved rings, said conduit and said supporting means.

2. A pressure fluid and power transmitting coupling for transmitting mechanical power and pressure fluid from one member to a second member rotatable relative to said first member; means to support said members for relative rotation; a hollow shaft mounted for rotation in said means; a casing fixed on one of said members; a coupling core mounted in said casing and including a pair of circumferentially grooved rings and a pair of passageways formed in said core; a tubular element in said hollow shaft and secured to said core at its one end, the other end of said tubular element fixed to said second member; conduits within said tubular element connected to each of said grooved rings through said passageways; conduits associated with said casing and connected to each of said grooved rings; said core and tubular element keeping said conduits in said tubular element in a predetermined relation during relative rotation of said members and said shaft; and means to prevent leakage of pressure fluid from said casing and core.

3. A fluid transmitting coupling for transmitting pressure fluid from one member to another member rotatable relative to said one member which comprises; a casing mounted on one of said members; a core member disposed within said casing; said casing and core being relatively rotatable; said core having a pair of grooved rings thereon and a pair of passageways formed therein; a pair of conduits communicating with and arranged in said casing; a pair of conduits arranged in said core and communicating with said grooved rings through said passageways; packing means disposed between said rings, said core and said casing to prevent leakage of pressure fluid when it is being transmitted through said grooved rings; and means to take up wear and vary the density of said packing means.

4. A fluid transmitting coupling for transmitting pressure fluid from one member to another member rotatable relative to the first member which comprises; a fixed casing on one of said members; a core member in said casing; said core member having a pair of passageways therein; said casing and said core being relatively rotatable; a pair of ports in said casing; a pair of ported pressure fluid conducting rings supported on said core and arranged to transmit pressure fluid to said core passageways; a tubular element rigidly fixed to said core at its one end and to the other of said members at its other end remote from said core; a pair of conduits carried within said tubular element and connected to said passageways, said conduits rigidly mounted in said tubular element and said tubular element adapted to resist any torsional strain imposed on said core and conduits when rotated relatively to said casing.

5. A fluid and power transmitting coupling for transmitting mechanical power and pressure fluid from one member to another member rotatable relative to the first member which comprises; a cylindrical supporting element connecting said members; a frame mounted on one of said members; a hollow power transmitting shaft supported in said cylindrical element for relative rotation with said cylindrical element; a tube disposed within said shaft; means to support said tube therein; a pressure fluid conducting coupling device mounted on said frame, said coupling device comprising a casing carried by said frame and a core fixed to said tube, said core and casing being relatively rotatable; a pair of conduits fixed in said tube and connected to said core; a pair of conduits connected to said casing; and passageways in said core arranged to transmit pressure fluid from one pair of conduits to the other irrespective of the relative rotational position of said casing and said core.

6. In a rotary coupling comprising; a casing; a core rotatable relative thereto; a pair of externally and internally grooved rings on said core provided with a plurality of apertures establishing communication between the internal and associated external groove of each pair of grooves, said core having a pair of passageways therein arranged to communicate respectively with the internal grooves of each of said rings; said casing having a pair of apertures arranged to communicate respectively with the external grooves of each of said rings; a conduit connected with each of said apertures in said casing; said rings adapted to maintain a constant connection between said casing apertures and said passageways; and packing means adapted to prevent pressure fluid from leaking to the atmosphere and from one passageway to the other.

7. A fluid and power transmitting coupling for transmitting mechanical power and pressure fluid from one member to another member rotatable relative to the first member which comprises; a cylindrical element connected between said members; a shaft mounted for relative rotation in said cylindrical element; a tube disposed within said shaft for relative rotation with respect to said shaft; a pressure fluid coupling including a casing rigidly mounted on one of said members and a core therein secured to said tube, said casing and said core being relatively rotatable the end of said tube remote from said casing fixed to the other of said members, said core having passageways therein; a pair of conduits disposed within said tube and associated with said core passageways; a pair of conduits connected to said casing; said core passageways arranged to conduct pressure fluid from one pair of conduits to the other; and means in said coupling to prevent leakage from one conduit to the other and to the atmosphere.

8. A fluid and power transmitting coupling for transmitting mechanical power and pressure fluid from one member to another member rotatable relative to the first member which includes; sleeve means to support said members for relative rotation; means to support a pinion in said sleeve for relative rotation; a tube disposed within said pinion and held against rotation relative to said pinion; a pair of conduits in said tube; a coupling casing fixedly mounted on one of said members and concentrically arranged with respect to said tube and pinion, said tube at its end remote from said coupling casing fixed to the other of said members; a coupling core rigidly secured to said tube and placed within said casing, said core and casing being relatively rotatable; a pair of conduits secured to said casing; said core having a pair of passageways therein, said tube conduits connected to said core passageways; and means on said core arranged such that each of said pairs of conduits are kept permanently interiorly connected in any relative rotative position of said core and casing.

9. A fluid and power transmitting coupling for transmitting mechanical power and pressure fluid from one member to another member rotatable relative to the first member which includes; sleeve means supporting said members for relative rotation; a pinion in said sleeve mounted for relative rotation with respect to said sleeve; a thin walled torsion resisting tube in said pinion and held against rotation relative to said pinion; a coupling housing fixed on one of said members concentrically mounted with respect to said thin walled tube, the end of said tube remote from said coupling casing fixed to the other of said members; a coupling core in said casing and directly secured to one end of said thin walled tube, said core having a pair of passageways therein; conduits in said tube and connected to each of said core passageways; conduit openings in said casing and connectible to said core passageways; and means on said core adapted to keep said conduits and conduit openings connected for the transmission or pressure fluid irrespective of the relative rotative position of said casing and said core.

10. A fluid and power transmitting coupling for transmitting mechanical power and pressure fluid from one member to another member rotatable relative to the first member which includes; sleeve and pinion means connecting said members for rotation relatively of each other; a coupling casing fixed on one of said members; a pair of conduits connected to said casing; a thin walled tube in said pinion means and held against rotation therein; a coupling core rigidly fixed to said tube and placed in said coupling casing and the end of said tube remote from the coupling casing fixed to the other of said members, said core having a pair of passageways therein; a pair of conduits rigidly held in said tube and connectible to said pair of passageways; ring means to connect said casing supported conduits to the core passageways in any relative rotative position of said core and casing; and means on said core within said casing to prevent the escape of pressure fluid from said conduits and said coupling casing and core to the atmosphere and from one conduit to the other.

11. In a coupling; a casing and a core therefore relatively rotatable of each other; a pair of conduits secured to said casing; a tube secured to said core; said core having passageways therein; a pair of conduits held in said tube and connected to said passageways; ring means on said core arranged to connect said two pairs of conduits irrespective of the relative rotative position of said core and casing; packing means in said coupling arranged to prevent the leakage of pressure fluid to the atmosphere and from one conduit to the other; and means to take up wear and slack in said packing means.

FRED L. WHITE.

CERTIFICATE OF CORRECTION.

Patent No. 2,308,137.　　　　　　　　　　　　　　January 12, 1943.

FRED L. WHITE.

It is hereby certified that error appears in the above numbered patent requiring correction as follows: In the heading to the printed specification, lines 7 and 8, and first column, line 48, date of patent, for "June 24, 1941" read --August 26, 1941--; and that the said Letters Patent should be read with this correction therein that the same may conform to the record of the case in the Patent Office.

Signed and sealed this 9th day of March, A. D. 1943.

(Seal)　　　　　　　　　　　　　　　　　　　Henry Van Arsdale,
　　　　　　　　　　　　　　　　　　　Acting Commissioner of Patents.